United States Patent
Büchler et al.

(10) Patent No.: US 10,646,953 B2
(45) Date of Patent: May 12, 2020

(54) PRESSURE WELDING DEVICE AND PRESSURE WELDING METHOD

(71) Applicant: KUKA Deutschland GmbH, Augsburg (DE)

(72) Inventors: Michael Büchler, Augsburg (DE); Otmar Fischer, Augsburg (DE)

(73) Assignee: KUKA DEUTSCHLAND GMBH, Augsburg (DE)

( * ) Notice: Subject to any disclaimer, the term of this patent is extended or adjusted under 35 U.S.C. 154(b) by 0 days.

(21) Appl. No.: 15/526,156

(22) PCT Filed: Nov. 12, 2015

(86) PCT No.: PCT/EP2015/076464
§ 371 (c)(1),
(2) Date: May 11, 2017

(87) PCT Pub. No.: WO2016/075252
PCT Pub. Date: May 19, 2016

(65) Prior Publication Data
US 2017/0304932 A1    Oct. 26, 2017

(30) Foreign Application Priority Data
Nov. 12, 2014 (DE) .................... 20 2014 105 433 U

(51) Int. Cl.
*B23K 20/12* (2006.01)
*B23K 9/00* (2006.01)
*B23K 9/08* (2006.01)

(52) U.S. Cl.
CPC .............. *B23K 20/12* (2013.01); *B23K 9/08* (2013.01); *B23K 20/125* (2013.01); *B23K 20/126* (2013.01)

(58) Field of Classification Search
None
See application file for complete search history.

(56) References Cited

U.S. PATENT DOCUMENTS

| 3,269,002 A | * | 8/1966 | Hollander | B23K 20/12 228/113 |
| 3,542,383 A | * | 11/1970 | Farley | B23B 31/207 269/49 |
| 3,591,068 A | * | 7/1971 | Farmer | B23K 20/121 156/73.5 |
| 3,599,857 A | * | 8/1971 | Loyd | B23K 20/12 228/2.3 |
| 3,694,896 A | * | 10/1972 | Loyd | B23K 20/12 156/580 |

(Continued)

FOREIGN PATENT DOCUMENTS

| DE | 91 15 951 U1 | 4/1992 |
| DE | 296 06 504 U1 | 8/1996 |
| DE | 20 2004 010386 U1 | 12/2005 |

*Primary Examiner* — Devang R Patel
(74) *Attorney, Agent, or Firm* — McGlew and Tuttle, P.C.

(57) ABSTRACT

A pressure welding method and a pressure welding device (1) includes a plasticizing unit (7), a compression unit (8), a machine head (13) that includes a spindle (54) and a component holder (34). The pressure welding device (1) further includes a spindle drive (56) and an actuation mechanism (41) that includes an actuation drive (65) for the component holder (34). The actuation drive (65) is placed between the spindle drive (56) and the spindle (54) within a drive train (57).

15 Claims, 7 Drawing Sheets

(56) References Cited

U.S. PATENT DOCUMENTS

| | | | |
|---|---|---|---|
| 3,740,827 A | | 6/1973 | Hunter et al. |
| 4,733,814 A | * | 3/1988 | Penman .................. B23K 20/12 228/114.5 |
| 4,757,932 A | * | 7/1988 | Benn .................... B23K 20/121 228/102 |
| 7,080,770 B2 | * | 7/2006 | Lovin ................... B23K 20/12 228/102 |
| 7,975,897 B2 | * | 7/2011 | Semmlinger .......... B23K 20/12 228/112.1 |
| 9,802,269 B2 | * | 10/2017 | Rudolph .............. B23K 20/121 |
| 2007/0181639 A1 | * | 8/2007 | Rudolph .............. B23K 20/121 228/101 |
| 2010/0206861 A1 | | 8/2010 | Rudolph et al. |
| 2013/0221070 A1 | * | 8/2013 | Okuno .................. B23K 20/26 228/2.3 |
| 2015/0298249 A1 | * | 10/2015 | Buchler ................. B23K 9/08 156/64 |
| 2016/0228978 A1 | * | 8/2016 | Buchler ................. B23K 9/08 |

\* cited by examiner

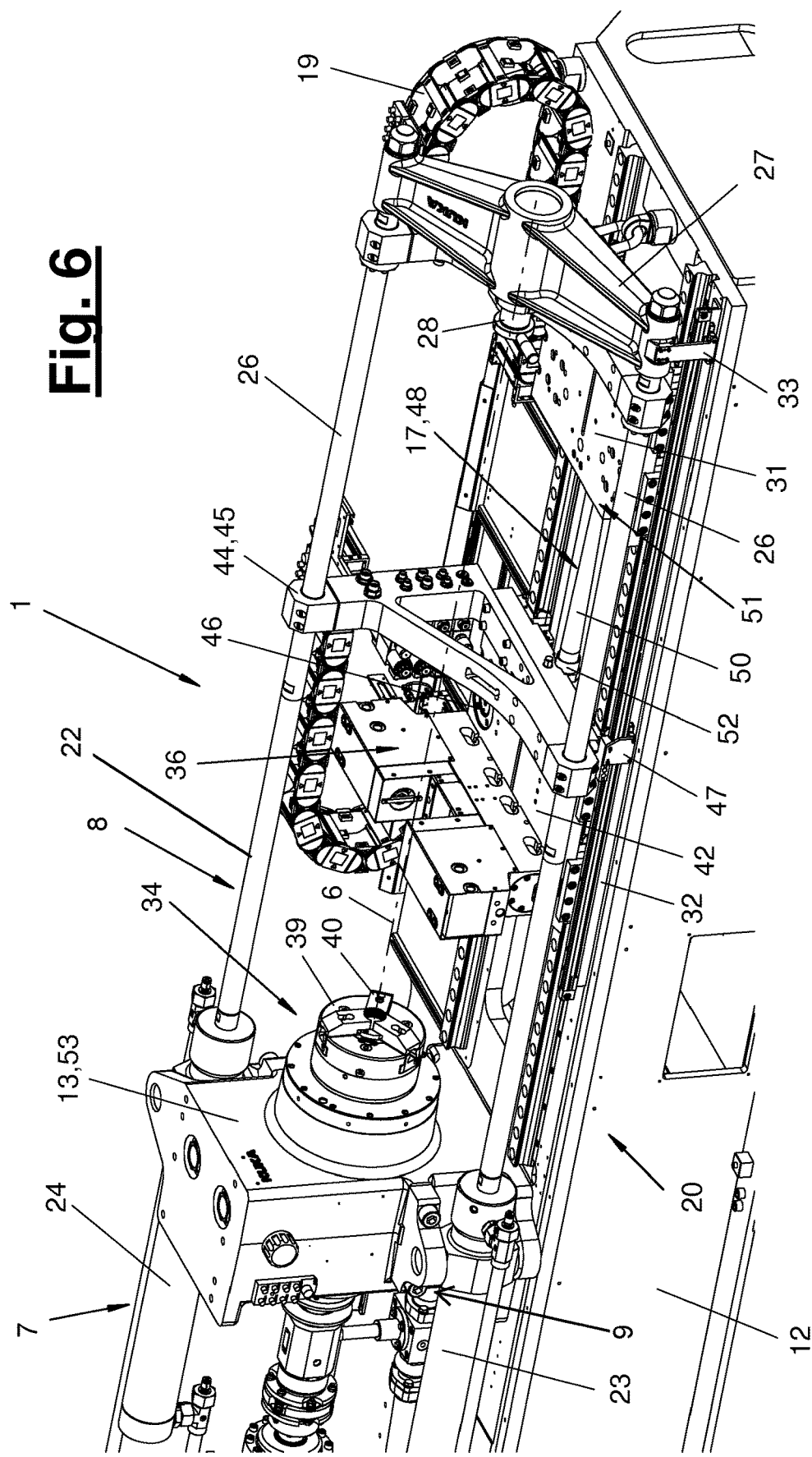

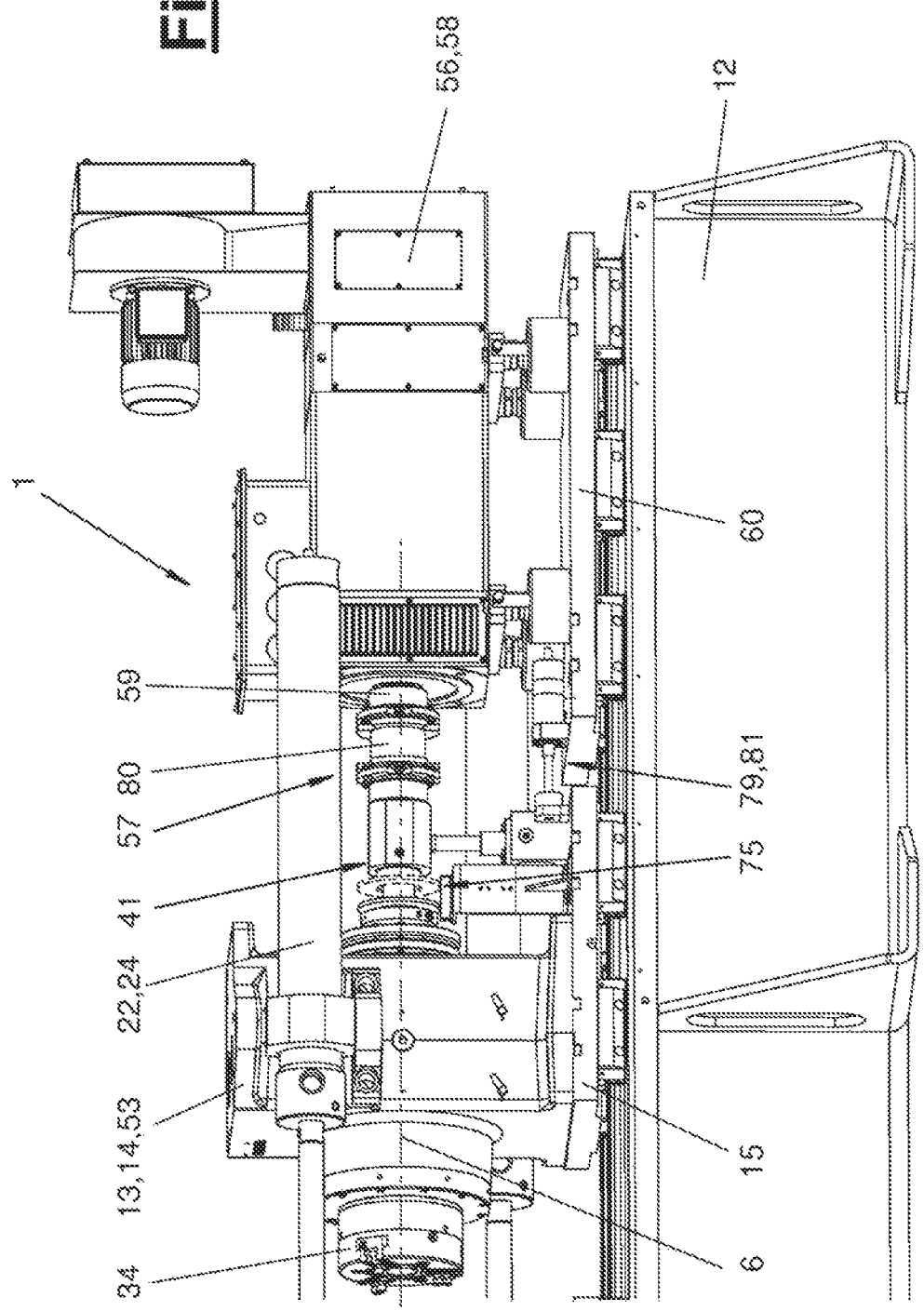

PRESSURE WELDING DEVICE AND PRESSURE WELDING METHOD

CROSS REFERENCE TO RELATED APPLICATIONS

This application is a United States National Phase Application of International Application PCT/EP2015/076464, filed Nov. 12, 2015, and claims the benefit of priority under 35 U.S.C. § 119 of German Application 20 2014 105 433.2, filed Nov. 12, 2014, the entire contents of which are incorporated herein by reference.

FIELD OF THE INVENTION

The present invention pertains to a pressure welding device with a plasticization device and with an upsetting device, wherein the pressure welding device has a machine head with a spindle and with a component mount, as well as a spindle drive and an actuating device with an actuating drive for the component mount and to a pressure welding method.

BACKGROUND OF THE INVENTION

Such a pressure welding device is known from DE 91 15 951 U1. It has a machine head with a rotating spindle and with a component mount for the component to be welded as well as a spindle drive and an actuating device with an actuating drive for the component mount. The spindle is configured as a hollow motor shaft of the spindle drive and carries a part of the motor winding. The actuating drive for the component mount is arranged at the rear end of the spindle or motor shaft, which end projects rearwardly from the motor housing.

SUMMARY OF THE INVENTION

An object of the present invention is to provide an improved pressure welding technique.

The pressure welding technique according to the invention, i.e., the pressure welding device and the pressure welding method, have various advantages. The pressure welding device and the pressure welding method make it possible, on the one hand, to increase the performance capacity and the quality of the process during pressure welding. On the other hand, the degree of automation and hence also the economy can be improved. Set-up and downtimes can be largely avoided or at least reduced. In addition, ergonomics is improved.

The actuating device according to the invention, especially its actuating drive, may be arranged at an axially spaced location from the component mount at the spindle end or spindle head. The component mount, especially its clamping device, can be made simpler, more compact and lighter as a result. The clamping device may have a one-step or multistep configuration. It may, in addition, be configured as a cost-effective chuck with radial jaw-shaped clamping elements, especially as a front end chuck.

The co-rotating drive housing can transmit the drive torque introduced by the spindle drive in an extensively deformation-free manner. This is especially advantageous for the accurate control and positioning of the spindle and of the mounted workpiece. In addition, very high drive torques can also be transmitted. The torsional rigidity of the drive train is improved and the inertia is reduced in the drive train.

The actuating device according to the invention can be accurately controlled or regulated by means of a measuring device for the actuating or adjusting stroke. Further, the operating position of the clamping device can be reliably detected by means of the measuring device. The actuating device has a very small and compact configuration. This makes possible a short length of the drive train, which is favorable in terms of torsion. The lightweight actuating device can be used for stationary and nonstationary machine heads and possibly moved along.

The actuating device according to the invention also offers advantages for the configuration and arrangement of the spindle drive. Due to the separation of the actuating device from the drive motor, the latter may have any desired configuration. This makes it possible to use cost-effective standard motors.

It is especially favorable to configure the spindle drive as a direct drive, in which case the drive motor can be flush with the drive train and the machine axis. The direct drive eliminates the need for the hitherto frequently necessary intermediate gear with a belt drive. The introduction of transverse forces onto the drive train can be avoided. The susceptibility to wear is markedly reduced.

In addition, additional components, e.g., a multiple disk brake, a rotary coupling for compensating alignment errors, a measuring device for torques as well as optionally speeds of rotation and the like may be accommodated in the drive train, which was not possible in DE 91 15 951 U1 and other conventional pressure welding devices. In addition, a mass decoupling can be implemented between the spindle drive and a machine head fed axially in the process.

It is further possible to combine the drive motor with a disk flywheel arrangement, which can be seated behind the drive motor when viewed from the machine head. In addition, the spindle drive may optionally be arranged on the machine frame stationarily or floatingly or displaceably in the direction of the machine axis. The actuating device according to the invention leads to a substantially wider bandwidth and freedom of configuration for the spindle drive. This makes possible, in addition, an adaptation to different machine and operating or process requirements.

The actuating device according to the invention has, in addition, advantages for the supply of operating materials. A rotary feed device, which can be adapted to the respective operating material or operating materials, can be provided for this. The rotary feed device has a very compact configuration and has advantages for recycling overflow oil. It may likewise be arranged between the spindle drive and the headstock. This has, in addition, the advantage of good accessibility for installation, inspection and maintenance purposes.

The pressure welding device may have different configurations. It may be configured, e.g., as a friction welding device. The components are preferably aligned here along the machine axis and plasticized on their front edges facing one another by friction and are connected to one another by subsequent axial upsetting. As an alternative, pressure welding with a rotatingly moved arc is possible. The rotation of the arc can be controlled here by a driving device. Such a pressure welding device may likewise have a rotatable component mount at the machine head.

The actuating device according to the invention has, in addition, advantages for the arrangement and the function of additional components of the pressure welding device.

An adjusting device permits simple and rapid adaptation of the pressure welding device to different component dimensions, especially component lengths. This adaptation pertains especially to the component mount arranged floatingly between the machine head and the upsetting head. It may take place automatically.

Optimization of the pressure welding process and optimal contacting of the components to be welded and of the upsetting head are achieved with the adjusting device. This is also advantageous for the optimization of the process sequences, especially a programmed control of the plasticization and upsetting phases as well as of the feeds and component shortenings occurring in the process. Welded parts of very high quality can be produced as a result. This pertains, on the one hand, to the quality of the welded connection and, on the other hand, to the constant length of the welded parts.

Within the framework of an independent inventive idea, the upsetting device is further modified with an upsetting drive arranged between the machine head and the upsetting head and acting by pulling. This upsetting drive has two or more parallel drive units, e.g., cylinders, which are arranged along and on both sides next to the machine axis. The cylinder housings are preferably supported at the preferably stationary machine head and the extensible piston rods are permanently connected to the upsetting head at their free end. The upsetting forces are transmitted hereby in a favorable manner in terms of kinking as pulling forces and not as forces of pressure any more as in the state of the art.

The claimed configuration and arrangement of the upsetting drive makes, in addition, possible a flow of forces in a closed circuit and between the machine head and the upsetting head, which ensures improved force support and avoids undesired deformations as well as relieves the load on the machine frame. The ergonomics and the accessibility at the operating area or on the operating side of the pressure welding device can be improved due to the different vertical positions of the cylinders, especially of the piston rods thereof. In addition, the floatingly mounted component mount can additionally be guided at the piston rods via plain bearings.

The present invention is schematically shown in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a perspective detail view of the pressure welding device from FIG. 1; and FIG. 7 is a side view showing a variant of the pressure welding device from FIG. 1.

DESCRIPTION OF THE PREFERRED EMBODIMENTS

Figure 1:
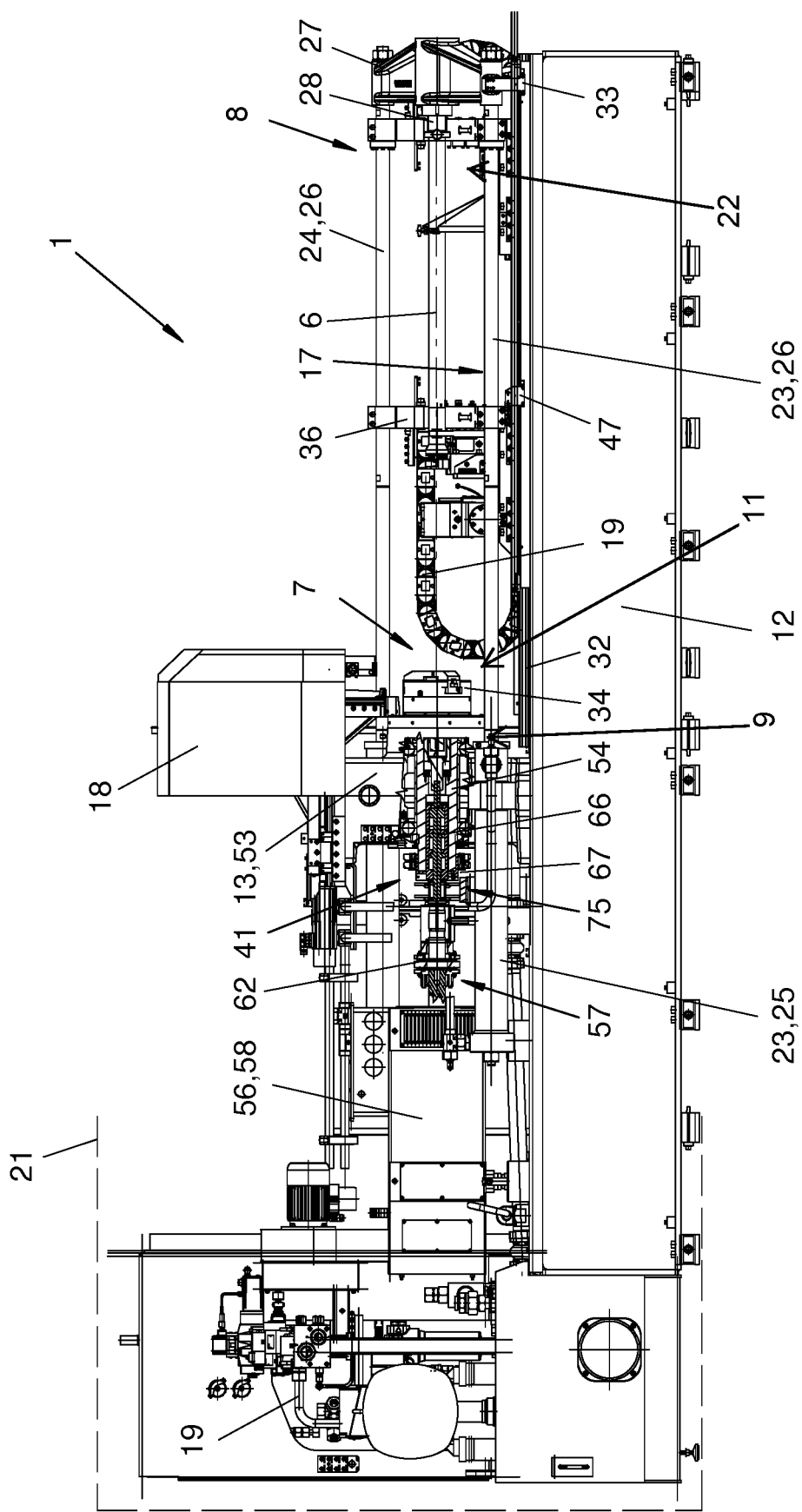
FIG. 1 is a partly cut-away side view showing a pressure welding device.

Referring to the drawings, the present invention pertains to a pressure welding device (1) and to a pressure welding method.

The pressure welding device (1) and the pressure welding method may have various configurations. Common to the different variants are a plasticization device (7) and an upsetting device (8), with which the components (2, 3) to be welded together are melted or softened on the sides or edges facing each other and subsequently upset while forming the welded part (5). The upsetting device (8) has for this an upsetting drive (22) and an upsetting head (27), which acts with an upsetting stop (28) on a component (3).

The pressure welding device (1) further has a machine and process control (not shown), which is connected to the machine components described below and controls these. The machine and process control is connected, in addition, to the sensing, detection or measuring devices mentioned below and processes the signals thereof. It may have a memory-programmable configuration and contain one or more process or sequence programs, a technology data bank, memories for programs and recorded process data, a quality monitoring along with logging or the like.

The plasticization device (7) and the plasticization method may have different configurations. The pressure welding device (1) is configured as a friction welding device in the embodiment shown in FIGS. 1 and 7, and the plasticization device (7) has a friction device (9).

In one variant, not shown, the plasticization device (7) may have an arc device, which heats and partially melts the edges of the components with an arc, wherein the arc is moved rotatingly with magnetic force along the circumference of the components by means of a driving device.

In each of the different variants, the pressure welding device (1) has a machine frame (12) with a longitudinal or machine axis (6) and a mounting (11) with component mounts (34, 36) for the components (2, 3) to be welded together. The machine frame (12) has a floor-mounted machine bed, on which the components of the pressure welding device (1), which will be explained below, are arranged. Further, an operating material supply unit (19) is present. It makes available the needed operating materials, especially electric current, hydraulic fluid, compressed air, lubricant and coolant or the like and routes these to the respective consumers.

The pressure welding device (1) has an enclosing protective housing (21) with a closable access on the operating side (20). Here, a worker, a robot or the like can feed the components (2, 3) to be joined and remove the finished welded part (5).

The pressure welding of the components (2, 3) takes place in the direction of the machine axis (6), along which the components (2, 3) are also aligned. The components (2, 3) are plasticized on the front sides or edges facing each other, especially by rotating friction or by the rotating arc (63), and are upset along the machine axis (6).

The components (2, 3) may consist of different materials. Metallic materials, especially steel, light metal alloys, cast alloys or the like are preferably used. The material pairings may be different. Especially iron-containing materials can be joined with nonferrous metals. In addition, nonmetallic materials, e.g., ceramic materials, can be welded, especially in conjunction with another metallic component.

The pressure welding device (1) further has a machine head (13) with a component mount (34) and with said upsetting head (27), which are mounted movably relative to one another along the machine axis (6) and are moved by the upsetting drive (22). In the exemplary embodiments shown in FIGS. 1 through 6, an individual machine head (13) is present, which is arranged and supported stationarily at the machine frame (12), the upsetting head (27) being arranged displaceably at the machine frame (12) along the machine axis (6).

The kinematics may alternatively be reversed, in which case the machine head (13) is arranged displaceably and the upsetting head (27) stationarily. Both may be displaceable in another variant. FIG. 7 shows a variant with a movable, especially displaceable machine head (13).

The pressure welding device (1) is configured as a single-head machine in the exemplary embodiments shown. As an alternative, the pressure welding device (1) may have a plurality of machine heads, which are arranged opposite each other along the machine axis (6). The pressure welding device (1) may be configured here as a double-head machine or as a double single-head machine with a stationary upsetting head between the machine heads. The arrangement shown in FIG. 7 with the displaceable machine head (13) may be, e.g., a part of a double-head machine or double single-head machine.

The friction device (9) has a rotatable shaft (54) in the exemplary embodiments shown, which will hereinafter be called spindle, a component mount (34) arranged on the front side at the spindle (54), a headstock and a spindle drive (56). The headstock (53) contains the mount, guide and support of the spindle (54) and is arranged and supported at the machine head (13). Additional components may be arranged in the drive train (57) between the spindle drive (56) and the spindle (54). These may be, e.g., a brake, which may be configured as a hydraulic multiple disk brake or as a simpler motor-stopping brake. Regenerative braking of the spindle drive (56) is also possible.

The above-mentioned arrangement may also be present in the mentioned variant of the plasticization device (7) with an arc device.

The pressure welding device (1) has an actuating device (41) for the component mount (34) at the machine head (13). In the embodiment shown, the component mount (34) has a clamping device (39) with one or more clamping elements (40). The actuating device (41) preferably acts on the clamping element or clamping elements (40).

Figure 2:
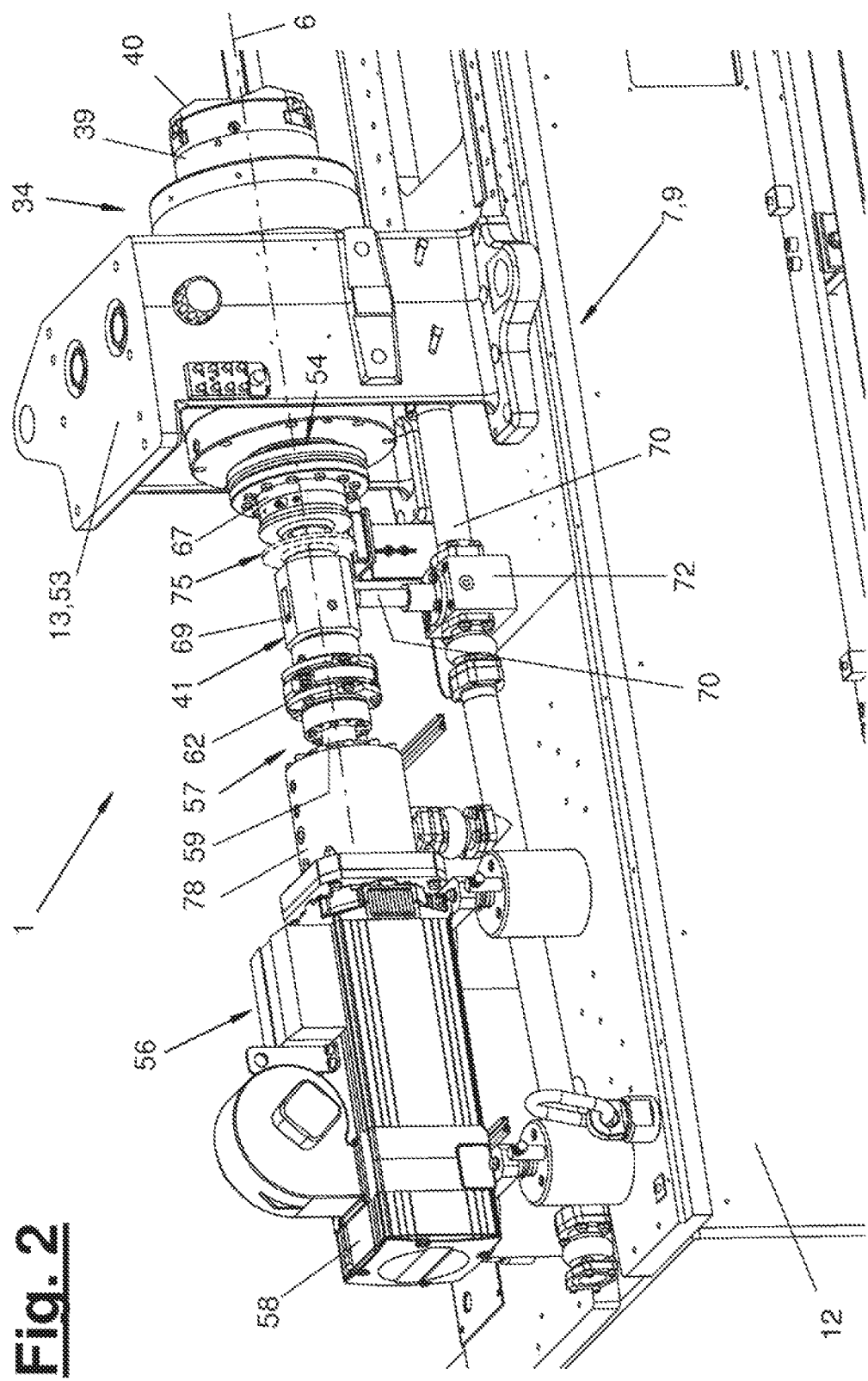
FIG. 2 is a perspective view showing an actuating device of the pressure welding device from FIG. 1.

The actuating device (41) has an actuating drive (65), which is arranged between the spindle drive (56) and the spindle (54) in the drive train (57). The actuating drive (65) is preferably arranged co-rotatingly in the drive train (57). FIG. 2 shows this arrangement.

Figure 3:
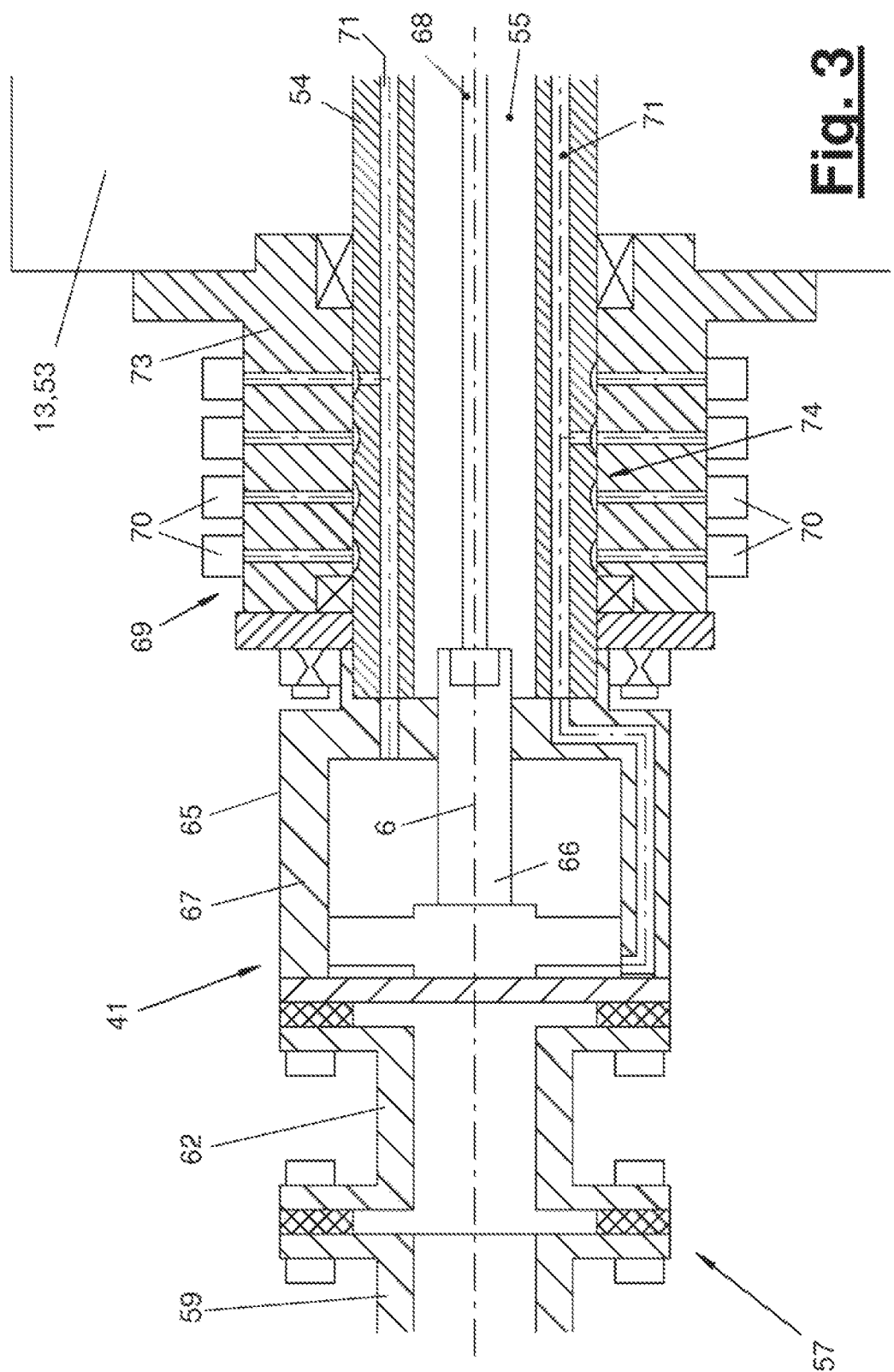
FIG. 3 is a longitudinal sectional view through a first variant of the actuating device.
Figure 4:
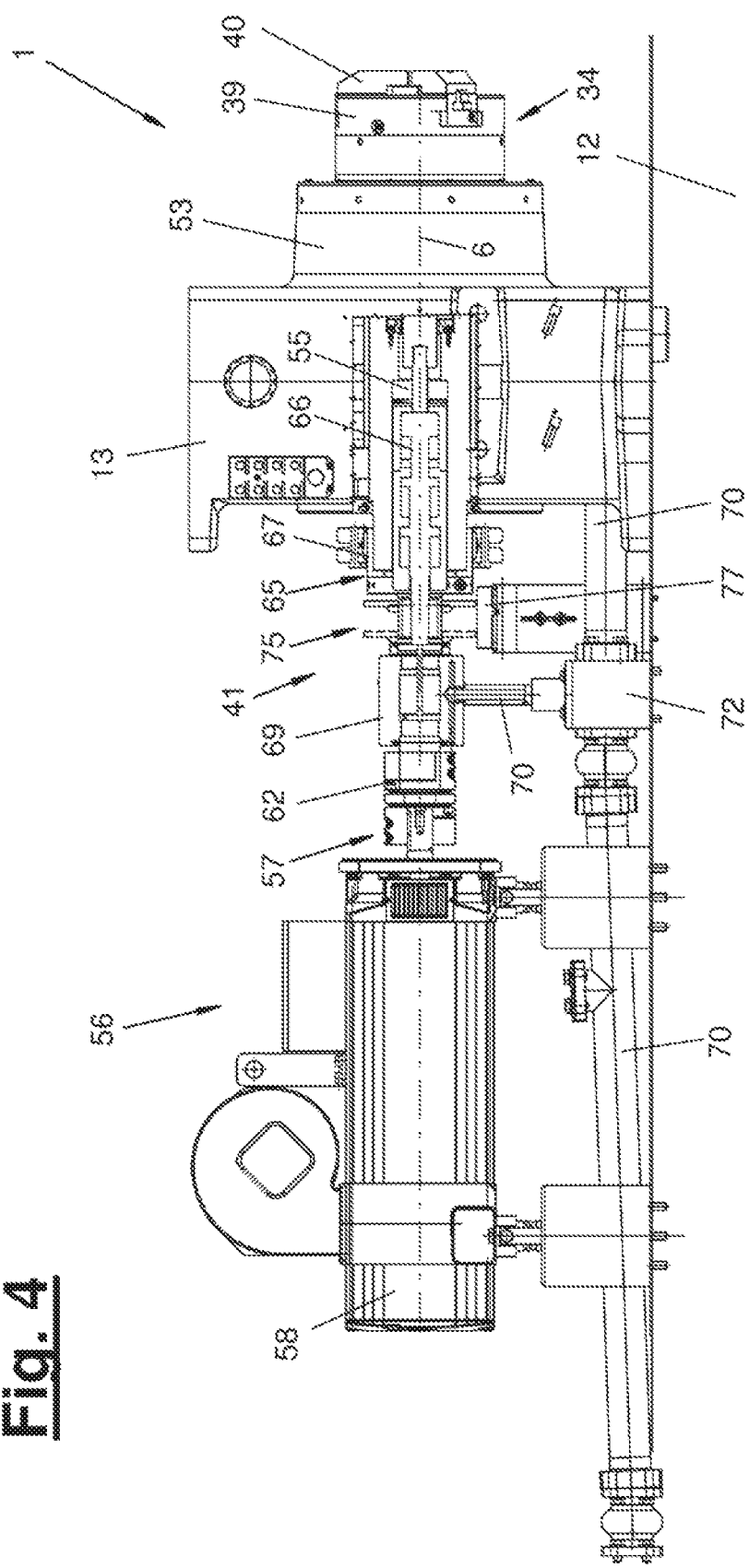
FIG. 4 is a partly cut-away side view of a second variant of the actuating device.
Figure 5:
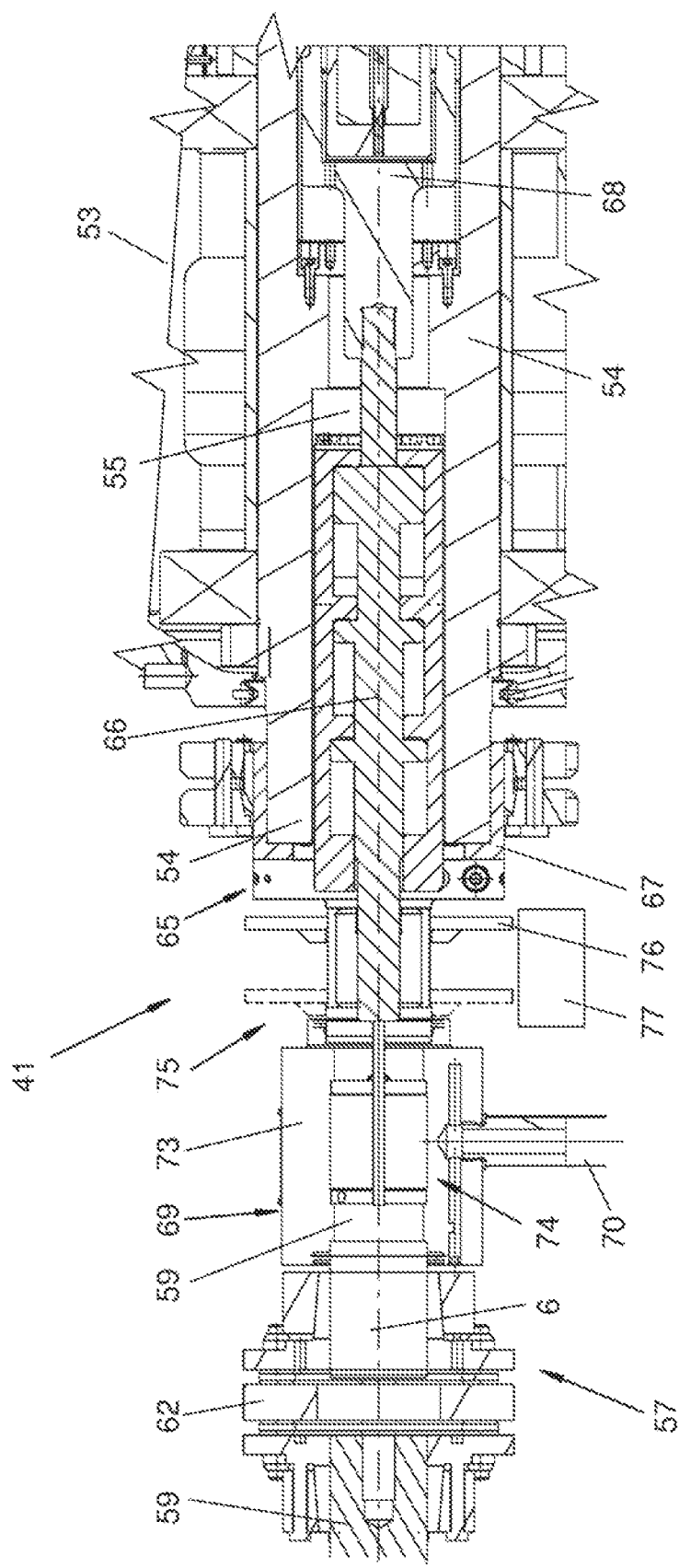
FIG. 5 is a cut-away and enlarged longitudinal sectional view of the second variant.

Two variants of the actuating device (41) and of the actuating drive (65) are shown in FIGS. 3 through 5.

In both variants, the actuating drive (65) has a rotatable drive housing (67, which is connected, on the one hand, to the spindle drive (56), especially to the drive shaft (59) thereof, and, on the other hand, nonrotatingly to the spindle (54) and transmits the drive torque. The drive housing (67) may be connected to the drive shaft (59) directly or indirectly via the intermediary of additional components, e.g., a coupling (62).

In the embodiment shown, the drive housing (67) is screwed to the output side of the coupling (62). The connection on the other side to the spindle (54) may be brought about in any desired manner, e.g., by a clamped connection, a pot-shaped housing attachment being placed on the spindle end with axial stop and being clamped radially. FIGS. 3 and 5 show this arrangement.

The spindle (54) preferably has a hollow configuration, and an actuating element (68), e.g., an axially oriented actuating rod, is arranged in its central interior space (55). The actuating element (68) is connected, on the one hand, to the actuating drive (65) and, on the other hand, to the component mount (34). For example, there may be a connection with the clamping device (39) and with the clamping element or clamping elements (40). The actuation takes place, e.g., by an axial pushing motion of the actuating element (68) in the direction of the machine axis (6). The actuating element (68) as well as the additional elements of the actuating drive (65) may be aligned flush or concentrically with the machine axis (6).

The actuating drive (65) may have any desired and suitable configuration and has an output element (66). In the exemplary embodiments shown, the actuating drive (65) is configured as a hydraulic drive and has an output element (66) configured as a piston arrangement. This element is connected to the actuating element (68). The piston arrangement (66) has a one-step configuration in the variant according to FIG. 3 and a multistep configuration with a plurality of pistons and work spaces in the other variants shown in FIGS. 4 and 5.

As an alternative, the actuating drive (65) may have a different configuration, e.g., as an electric motor-powered adjusting drive, in which case, e.g., the output element (66) is configured as a pinion and the actuating element (68) as a driving rod, e.g., toothed rack or threaded spindle.

In the variant according to FIG. 3, the drive housing (67) and the piston arrangement (66) are arranged essentially outside the spindle (54), and only the piston rod protrudes somewhat into the cavity (55) and is connected to the actuating element (68) there. In the variant according to FIGS. 4 and 5, the drive housing (67) and the output element (66), especially the piston arrangement, are arranged for the most part in the cavity (55) of the hollow spindle (54). The stepped drive housing (67) has a pot-shaped collar, which extends around the spindle end with an axial stop and is clamped against the spindle jacket by means of a clamping device. This arrangement saves space and also facilitates the supply with operating materials, especially with hydraulic fluid.

Such partly integrated arrangements of drive housing (67) and output element (66) in the hollow spindle (54) are also possible in other variants of the actuating drive.

The actuating stroke of the actuating device (41) can be detected and controlled or regulated with a measuring device (75). For example, the adjusting motion of the actuating drive (65) and of the output element (66) as well as of the actuating element (68) connected thereto are detected and controlled or regulated for this. The measuring device (75) is connected to the machine and process control.

The measuring device (75) has a movable measuring element (76) and a stationary measuring apparatus (77). The measuring element (76) is connected, e.g., to the output element (66) and is moved by this axially in the direction of the machine axis (6). It may be configured, e.g., as a ring-shaped, thin-walled measuring disk. The measuring apparatus (77) detects the axial motion and position of the measuring element (76). This may happen in any desired manner, e.g., in a contactless manner and optionally by means of an inductive, capacitive or optical sensor system. The operating position assumed when the clamping device (39) is actuated is indicated in the drawings by solid lines and the retracted resting position with clamping device (39) released by broken lines.

The actuating device (41) further has a rotary feed device (69) for operating materials from the outside to the actuating drive (65) rotating with the spindle (54). The operating material or operating materials may be, e.g., hydraulic fluids and/or electric current or the like. A connection for a flexible tube, not shown, or a cable is arranged for this on a stationary feed housing of the rotary feed device (69). Further, external lines (70) for overflow oil as well as a connection head (72), which may also have a support function for the rotary feed device (69) at the same time, are provided. Internal lines (71) to the output element (66) optionally arranged in the spindle (54) may be laid in the interior space (55) or in the jacket of the spindle (54).

In each of the different variants according to FIGS. 3 through 5, the rotary feed device (69) has a stationary feed housing (73) with an inner, rotating ring distributor (74) as well as an internal line (71), which is connected to the actuating drive (65). The ring distributor (74) and the internal line (71), of which there may be one or more than one, are arranged at a shaft, which likewise transmits the drive torque in a deformation-free manner and is dimensioned correspondingly. This may be the drive shaft (59), the spindle (54) or an inserted shaft.

The ring distributor is arranged between the drive housing (67) and the machine stock (13) in the exemplary embodiment according to FIG. 3. The ring distributor (74) has circumferential ring lines on the jacket of said shaft, e.g., of the spindle (54). The ring lines are connected, on the one hand, to a radial branch canal in the feed housing (73), on the one hand, and to an internal axial line (71) in the jacket of the spindle (54), on the other hand. The internal lines (71) continue in the drive housing (67) and open at the working chambers of the piston arrangement (66) in front of and behind the piston. The internal lines (71) are configured as feed and discharge lines.

In the second variant according to FIGS. 4 and 5, the feed housing (73) and the ring distributor (74) are arranged between the spindle drive (56) and the drive housing (67). The ring distributor (74) and its ring lines are associated on the circumference with the drive shaft (59), and the internal lines (71), which are only suggested here, are arranged in the drive shaft (59).

An arrangement corresponding to both variants may also be present in an electrical actuating drive (65). The ring distributor (74) is configured here, e.g., as a slip ring arrangement.

The external line (70) mentioned for the overflow oil, whose line sections are connected to the above-mentioned branch lines in the ring distributor (74), are arranged at the stationary feed housing (73) on the outside. The preferably vertical external line (70) is connected to the preferably stationary connection head (72) and can also integrated into a support function for the feed housing (73). This line (70) may be arranged, e.g., at or in a rocker pendulum between the connection head (72) and the feed housing (73). One external line or additional external lines (70), which are in turn connected to the operating material supply unit (19), are arranged at the connection head (72).

The connection head (72) is arranged stationarily at the machine frame (12) in the exemplary embodiments shown in FIGS. 1 and 2. The machine head (13) may likewise be arranged stationarily. In the variant according to FIG. 7, the machine head (13) is arranged movably, especially displaceably along the machine axis (6). It is located, e.g., on a carrier (15), especially a slide, on which the connection head (72) may also be arranged and can follow the motions of the machine head.

In case of a hydraulic actuating drive (65), the operating material supply unit (19) has a pump unit and a valve arrangement for supplying and connecting the hydraulic actuating drive (65) and the output element (66) thereof. A power source and a switching device are correspondingly present in case of an electrical actuating drive (65).

The spindle drive (56) is configured as a direct drive in the embodiment shown. It has, e.g., an electric drive motor (58), whose motor shaft (59) forms the drive shaft and is aligned essentially flush with the longitudinal axis of the spindle (54) and with the machine axis (6). The drive train (57) is likewise aligned along the machine axis (6). The drive shaft (59), e.g., the motor shaft, is coupled with the actuating device (41) via said coupling (62). The coupling (62) has a nonrotatable and flexurally elastic configuration. It can possibly compensate alignment errors, especially lateral offset and/or oblique position.

As an alternative, the drive motor (58) may be arranged laterally offset from the spindle (54) as well as from the machine axis (6) and drive the spindle (54) via an intermediate gear, especially a belt drive. Further, the drive motor (58) may have another configuration, e.g., it may be configured as a hydraulic motor.

In another variant, the spindle drive (56) may have a disk flywheel arrangement (not shown). The disk flywheels are set into rotation by the drive motor (58) about the machine axis (6) and then bring about an inertia drive for the spindle (54), and a controllable brake can control or regulate the speed of rotation in the drive train (57) and optionally also stop the rotation. The disk flywheel arrangement can be separated from the drive motor (58) and optionally from the spindle (54) by means of a coupling.

The upsetting head (27) has, e.g., a yoke-like configuration and has a carrier (31) with a support (29), at which the upsetting stop (28) is arranged and the upsetting drive (22) is connected. The carrier (31) is configured, e.g., as a slide and is guided and mounted on the machine bed (12) via a guide (32), e.g., via bilateral axial guide rails. The upsetting head (27) further has a detection device (33) for its position and the travel path.

The mounting (11) for the components (2, 3) has, in addition to the component mount (34) of the machine head (13), an additional component mount (36) is provided, which is mounted floatingly between the machine head (13) and the upsetting head (27) on the machine frame (12). This additional component mount (36) is used to receive the second component (3) and is also called central mount. The additional component mount or central mount (36) likewise has a carrier (42), especially in the form of a slide, which is mounted and guided displaceably on the machine frame (12) in the direction of the machine axis (6). It may be arranged one after another with the upsetting head (27) on a common guide (32).

The component mount (36) may be fixed, when needed, by means of a controllable fixing device (46) on the machine bed (12), especially on the guide (32), by clamping or in another manner. The component mount (36) likewise has a detection device (47) for the position and/or the path along the machine axis (60. The detection devices (33, 47) may have identical configuration and use a common measuring rail.

The upsetting head (27) acts with the upsetting stop (28) on the (3) from the rear in the direction of the machine axis (6), and this may happen by means of a direct contact or via the intermediary of an upsetting rod.

The upsetting device (8) acts between the machine head (13) and the upsetting head (27) in the exemplary embodiments shown and generates pulling forces in the direction of the machine axis (6). The upsetting device (8) has an upsetting drive (22), which is arranged between the machine head (13) and the upsetting head (27) and is connected to both. The upsetting drive (22) acts by pulling and pulls the components (13, 27) against one another.

The upsetting drive (22) may have various configurations. In the exemplary embodiments shown, it has two or more parallel drive units (23, 24), which are aligned along the machine axis (6). The drive units (23, 24) are arranged on different sides of the machine axis (6), especially on both sides and are located diametrically opposite each other in relation to the machine axis (6). The drive units are preferably configured as cylinders.

The drive units (23, 24) may be configured, as an alternative, differently, e.g., as electric rod or spindle drives. The arrangements and configurations explained below in connection with the cylinders (23, 24) shown correspondingly also apply to other embodiments of drive units.

The cylinders (23, 24) are arranged at different levels above the machine bed (12). The cylinder (23) located adjacent to the operating area or the operating side (20) is arranged in a low location and just barely above the top side of the machine bed (12).

The cylinders (23, 24) are preferably configured as hydraulic cylinders. They have each an extensible piston rod (26) and a cylinder housing (25). The cylinder housings (25) are preferably mounted and supported at the machine head (13). The free ends of the piston rods (26) are secured on the upsetting head (27). The drive housing (25) and the extensible drive element (26), e.g., a toothed rack or a threaded spindle, may be arranged and connected correspondingly in other drive units.

In the exemplary embodiments shown in FIGS. 1 and 2, the central component mount (36) may likewise be connected to the upsetting drive (22), especially to the piston rods (26). A support (44), which is connected to the piston rods (26) via plain bearings (45), is fastened to the carrier or slide (42).

In the variant according to FIG. 7, the upsetting drive (22) moves the machine head (13) relative to a stationary upsetting or support head (not shown) supported at the machine frame (12). The machine head (13) may have a detection device for path and/or position. Further, a mass decoupling device (79), which decouples the machine head (13) during the feed thereof in the welding process from the spindle drive (56) in the axial direction (6), may be provided in the drive train (57). An axially tolerant coupling (80), e.g., a pushing sleeve, in the drive train (57) can ensure here the maintenance of the rotating drive during the feed of the machine head (13). As an alternative, a mutual spacing may also take place, while the drive transmission is eliminated.

The spindle drive (56) may optionally now be arranged on a slide-shaped drive carrier (60) and mounted axially displaceably on the machine frame (12) and detachably connected to the machine head (13), especially the carrier (15) thereof, via a coupling device (81). The spindle drive (56) may further be locked temporarily at the machine frame (12) by means of a drive fixing device for the mass decoupling.

In each of the various embodiments, the pressure welding device (1) has an adjusting device (17) for adaptation to different component dimensions, especially component lengths. The adjusting device (17) preferably operates automatically. The adaptation takes place by means of an adjustment of the upsetting head (27) in FIGS. 1 and 2 and by means of an adjustment of the machine head (13) in FIG. 7.

The adjusting device (17) has a controllable and variable-length coupling device (48) between the central component mount (36) and the upsetting head (27). The coupling device (48) ensures the connection of the components (36, 37) in the direction of the machine axis (60 and is preferably connected to the carriers (31, 42) thereof. According to FIGS. 1 and 2, the distance between the component mount (36) and the upsetting head (27) can be changed and adapted as needed in the direction of the machine axis (6) with the adjusting device (17) and especially the coupling device (48) thereof.

On the one hand, a coarse adjustment is possible hereby for adaptation to different length dimensions of different components (2, 3). In addition, minor changes in the component dimensions can be compensated. Such changes are caused, e.g., by insertion tolerances, component tolerances, especially length tolerances, an elastic shortening of a component (3) during the pressure welding process or the like.

Further, a measuring device (not shown) with a measuring shaft for the detection of the drive torque and optionally the drive speed may be arranged in the drive train (57) between the spindle drive (56) and the spindle (54). The measuring device may be inserted between the motor shaft (59) and the spindle (54) or the actuating device (41). The drive or motor shaft may have a split configuration, in which case the measuring shaft is inserted between the shaft halves. As an alternative, the drive or motor shaft may be provided with suitable measuring elements and form the measuring shaft.

FIG. 1 shows, in addition, the arrangement of a machining device (18) for the welded part (5) or for one or more components (2, 3) before and/or during the welding. The machining device (18) is configured, e.g., as a turn-off device for the weld bead on the welded part (5). In addition, it can face the front sides of one or both components (2, 3) prior to the welding.

The welded part (5) may be rotated by the component mount (34) or by the spindle drive (56) for such a machining. The clamping device (39) of the central component mount (36) may open in this case. A component support (38), which is schematically shown in FIG. 5 and is configured, e.g., as a steady rest with rollers and supports the rotating welded part (5), may be arranged at the component mount (36), especially on the carrier (42) thereof.

Various modifications of the exemplary embodiments shown and described are possible. In particular, the features of the different exemplary embodiments may be combined with and even replaced by one another as desired. The upsetting drive (22) may be configured in the conventional manner, e.g., according to the state of the art described in the introduction. The upsetting head (27) may be correspondingly modified in this case.

While specific embodiments of the invention have been shown and described in detail to illustrate the application of the principles of the invention, it will be understood that the invention may be embodied otherwise without departing from such principles.

The invention claimed is:

1. A pressure welding device with a plasticization device comprising an upsetting device, the pressure welding device comprising:
   a machine head with a spindle;
   a component mount comprising a clamping device;
   a spindle drive; and
   an actuating device with an actuating drive for actuating the component mount, wherein the actuating drive is arranged in a drive train between the spindle drive and the spindle, the actuating drive having a rotatable drive housing, which is rotatingly connected to a drive shaft of the spindle drive and to the spindle and transmits drive torque, the actuating drive being configured as an electric or hydraulic drive, the actuating device having a rotary feed device for feeding operating materials comprising hydraulic fluid or electric current to the actuating drive, rotating with the spindle, from outside, for co-rotating the actuating drive, the rotatable drive housing being located between the drive shaft of the spindle drive on one side and the spindle on another side, wherein an operating position of the clamping device of the component mount is detected by a measuring device for measuring an actuating stroke or an adjusting stroke of the actuating device.

2. A pressure welding device in accordance with claim 1, wherein the spindle drive has a drive motor arranged essentially flush with a machine axis and with a spindle axis.

3. A pressure welding device in accordance with claim 1, wherein the actuating device further comprises an actuating element for the component mount, the actuating element being connected to the actuating drive, and being arranged in an interior space of the spindle and the spindle is a hollow spindle.

4. A pressure welding device in accordance with claim 3, wherein the actuating element is functionally connected to a clamping device of the component mount.

5. A pressure welding device in accordance with claim 3, wherein an output element of the actuating drive is arranged at least partly in the interior space of the hollow spindle.

6. A pressure welding device in accordance with claim 1, wherein an output element of the actuating drive is configured as a one-step or multistep piston arrangement.

7. A pressure welding device in accordance with claim 1, wherein the rotary feed device has a stationary feed housing and a ring distributor as well as an internal line, which is connected to the actuating drive and is arranged at a drive shaft or at the spindle.

8. A pressure welding device in accordance with claim 1, wherein the rotary feed device has an external line and a stationary connection head.

9. A pressure welding device in accordance with claim 1, further comprising an upsetting head wherein the upsetting head and the machine head are movable relative to one another along a machine axis, wherein a component mount is mounted between the upsetting head and the machine head floatingly on a machine frame, and the pressure welding device has an adjusting device for adaptation to different component dimensions including component lengths.

10. A pressure welding device in accordance with claim 1, wherein the pressure welding device is configured as a friction welding device, wherein the plasticization device has a friction device.

11. A pressure welding device in accordance with claim 1, wherein the pressure welding device is configured as a welding device with a magnetically moved arc, wherein the plasticization device has an arc device.

12. A method for pressure welding with a pressure welding device, which has a plasticization device and an upsetting device as well as a machine head with a spindle and with a component mount, as well as a spindle drive and an actuating device with an actuating drive for the component mount, the method comprising:

arranging the actuating drive in a drive train between the spindle drive and the spindle; and actuating the component mount by the actuating drive arranged in the drive train between the spindle drive and the spindle, the actuating drive having a rotatable drive housing, which is rotatingly connected to a drive shaft of the spindle drive and to the spindle and transmits drive torque, the actuating drive being configured as an electric or hydraulic drive, wherein operating materials are fed to the actuating drive rotating with the spindle from outside by a rotary feed device arranged between the spindle drive and the machine head, the rotatable drive housing being located between the drive shaft of the spindle drive on one side and the spindle on another side, wherein an operating position of a clamping device of the component mount is detected by a measuring device for measuring an actuating stroke or an adjusting stroke of the actuating device.

13. A method in accordance with claim 12, wherein the component mount is actuated by the actuating drive arranged at an axially spaced location from the component mount.

14. A method in accordance with claim 12, wherein the actuating device is controlled or regulated by the measuring device for measuring and actuating or adjusting stroke.

15. A method in accordance with claim 12, wherein the components to be welded together are plasticized on front edges facing each other by friction or by a rotatingly moved arc.

* * * * *